United States Patent [19]

Ehrnsberger et al.

[11] Patent Number: 5,549,182

[45] Date of Patent: Aug. 27, 1996

[54] FRICTIONAL DAMPER, IN PARTICULAR FOR SPINNER-TYPE WASHING MACHINES

[75] Inventors: Manfred Ehrnsberger, Berg; Dieter Mayer, Sulzbach-Rosenberg; Helge Siegner, Altdorf, all of Germany

[73] Assignee: Suspa Compart Aktiengesellschaft, Altdorf, Germany

[21] Appl. No.: 466,432

[22] Filed: Jun. 6, 1995

[30] Foreign Application Priority Data

Jun. 7, 1994 [DE] Germany .......................... 44 19 870.1

[51] Int. Cl.⁶ ........................ D06F 37/22; F16F 7/08
[52] U.S. Cl. ................ 188/129; 188/381; 267/202; 267/203
[58] Field of Search ........................ 188/129, 381, 188/67, 271; 267/202, 203, 196, 214, 216, 201, 134, 200, 207; 213/22, 31, 32 A

[56] References Cited

U.S. PATENT DOCUMENTS

| | | | |
|---|---|---|---|
| 1,019,504 | 3/1912 | McCombs | 188/129 |
| 2,373,508 | 4/1945 | Snyder | 267/201 |
| 2,427,427 | 9/1947 | Tykeson | 188/129 |
| 2,705,634 | 4/1955 | Sampson et al. | 267/203 |
| 3,713,516 | 1/1973 | Freyler | 188/129 |
| 3,806,105 | 4/1974 | Konishi et al. | 188/129 |
| 4,955,467 | 9/1990 | Kallenbach | 188/381 |
| 4,991,412 | 2/1991 | Bauer et al. | |
| 5,257,680 | 11/1993 | Corcoran et al. | 188/129 |
| 5,295,564 | 3/1994 | Stadelmann | |

FOREIGN PATENT DOCUMENTS

| | | | |
|---|---|---|---|
| 0407755 | 1/1991 | European Pat. Off. | |
| 0869774 | 2/1942 | France | 267/216 |
| 3336862 | 8/1984 | Germany | |
| 212564 | 8/1984 | Germany | |
| 4018599 | 1/1991 | Germany | |
| 4030869 | 4/1992 | Germany | |
| 5141466 | 6/1993 | Japan | |
| 1303772 | 4/1987 | U.S.S.R. | 188/381 |

*Primary Examiner*—Douglas C. Butler
*Attorney, Agent, or Firm*—Browdy and Neimark

[57] ABSTRACT

A frictional damper for spinner-type washing machines comprises a housing and a tappet, which is coaxially displaceable within the latter and the inner end of which is provided with a damping piston. The damping piston is disposed on a piston-bearing section of the tappet to be displaceable between biased compression springs bearing against stops, and provided with a friction lining elastically pressed against the inside wall of the housing.

17 Claims, 3 Drawing Sheets

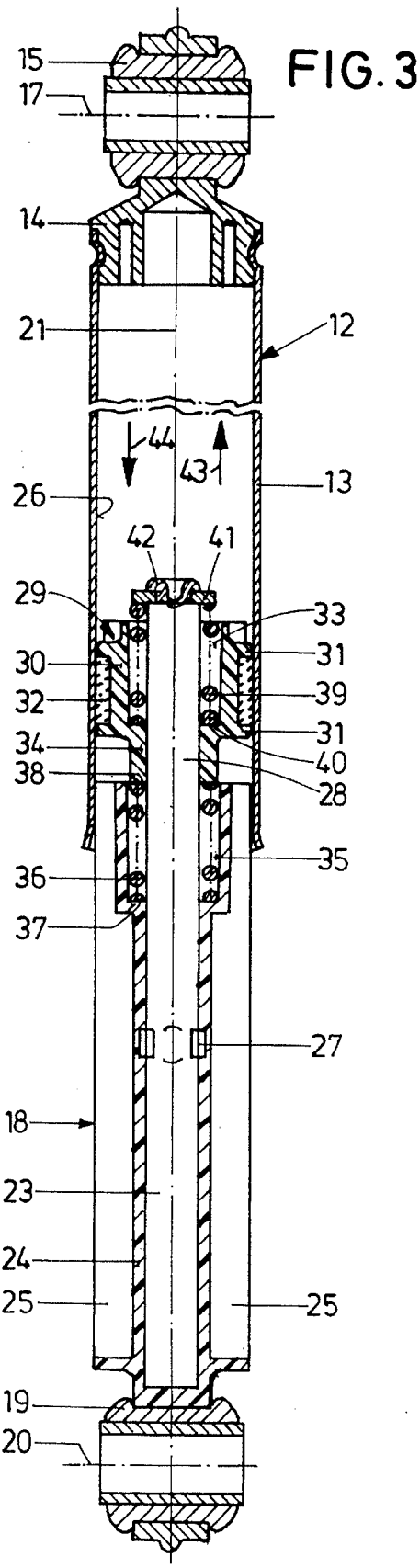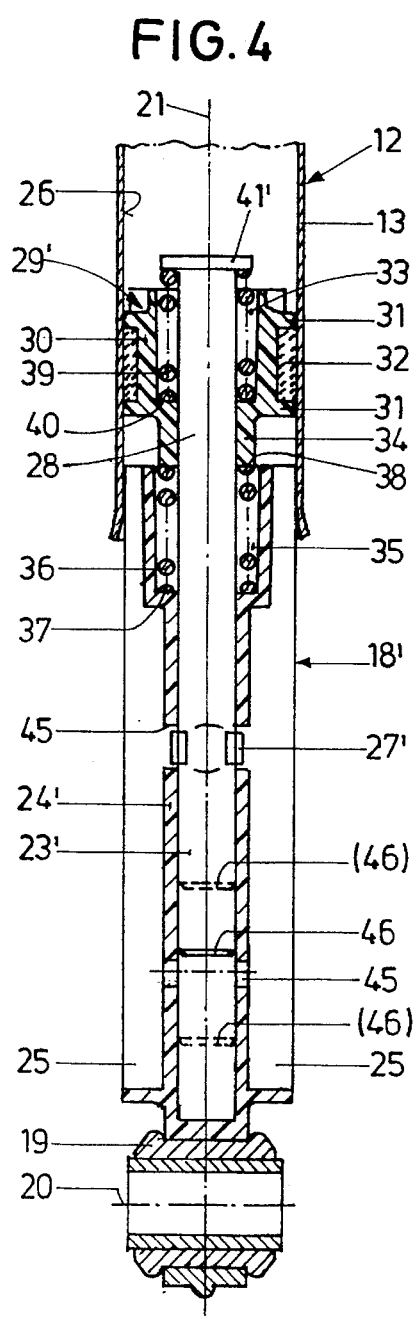

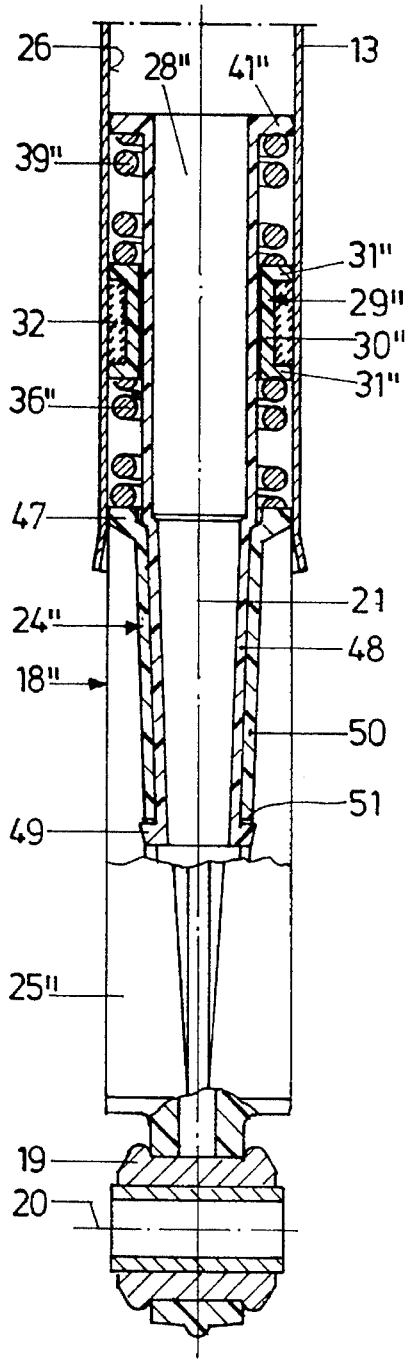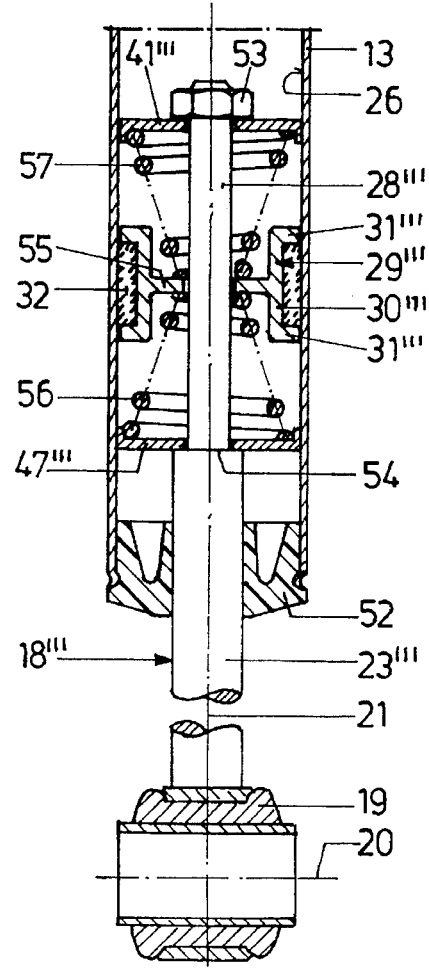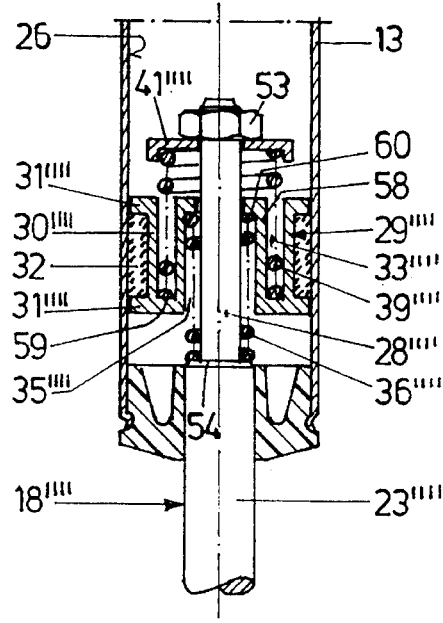

FRICTIONAL DAMPER, IN PARTICULAR FOR SPINNER-TYPE WASHING MACHINES

BACKGROUND OF THE INVENTION

1. Field of the Invention

The invention relates to a frictional damper, in particular for spinner-type washing machines, comprising a housing with a substantially annular cylindrical inside wall and a tappet coaxially displaceable in the housing and one end of which is guided out of the housing and the other end of which is provided with at least one damping piston, the latter being disposed on a piston-bearing section of the tappet to be displaceable between spring elements bearing against stops and provided with a friction lining elastically pressed against the inside wall of the housing, and fastening elements being formed on the respective end of the tappet and of the housing.

2. Background Art

In a frictional damper of the generic type known from EP 0 407 755 A1, several damping pistons are displaceably supported on a piston-bearing section of the tappet. On either side of the damping piston, stops are provided on the piston-bearing section, spring elements in the form of disk springs or self-damping elastic rings, for instance polyurethane rings, lying against the stops. The spring elements may differ in length and adjustment, for retarded driving of the individual friction linings to be achieved. This design is to ensure that amplitude-responding vibration damping can be achieved, a soft transition being envisaged in particular during the change of direction of the motion of the tappet relative to the housing. This is meant to make the system work with little noise.

SUMMARY OF THE INVENTION

It is the object of the invention to embody a frictional damper of the genetic type such that while a soft transition with little noise is maintained at the points of reverse, uniform damping is achieved over the full stroke in the case of high amplitudes and very little damping in the case of low amplitudes.

According to the invention, this object is solved in that the spring elements are biased compression springs having a biasing force. The measures according to the invention ensure that during operation in the sub-critical range, the full frictional force is achieved between the points of reverse, while a soft transition is simultaneously attained at the points of reverse.

Further features, advantages and details of the invention will become apparent from the ensuing description of an exemplary embodiment, taken in conjunction with the drawing.

BRIEF DESCRIPTION OF THE DRAWING

FIG. 3 is a longitudinal section of a vibration damper,

FIG. 4 is a partial longitudinal section through an embodiment of a vibration damper modified as compared with FIG. 3, FIG. 5 is a partial longitudinal section through another modified embodiment of a vibration damper, FIG. 6 is a partial longitudinal section through another modified embodiment of a vibration damper, and FIG. 7 is a partial longitudinal section of another modified embodiment of a vibration damper.

DESCRIPTION OF THE PREFERRED EMBODIMENT

Figure 1:
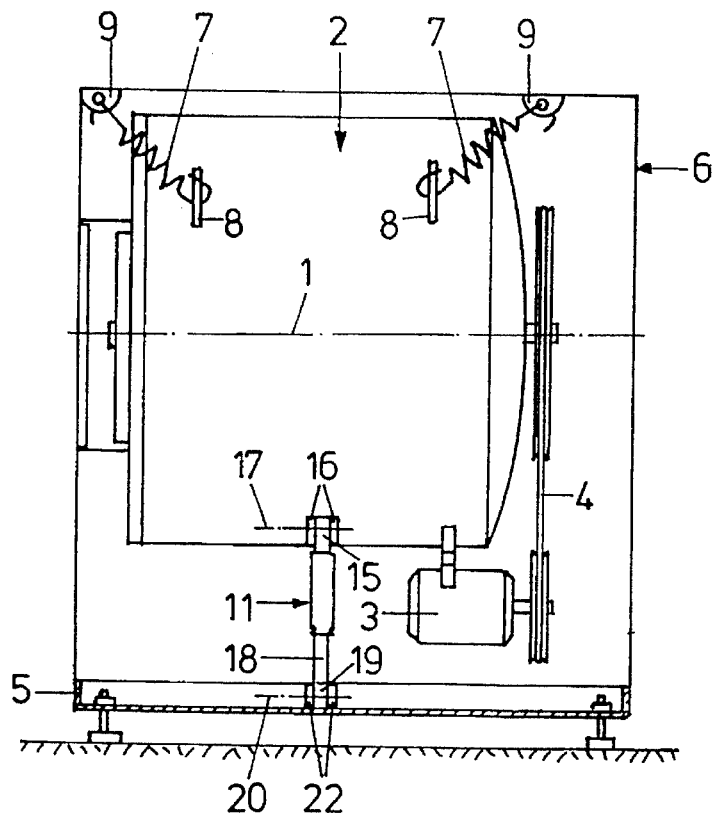
FIG. 1 is a diagrammatic lateral view of a rotary-drum washing machine.
Figure 2:
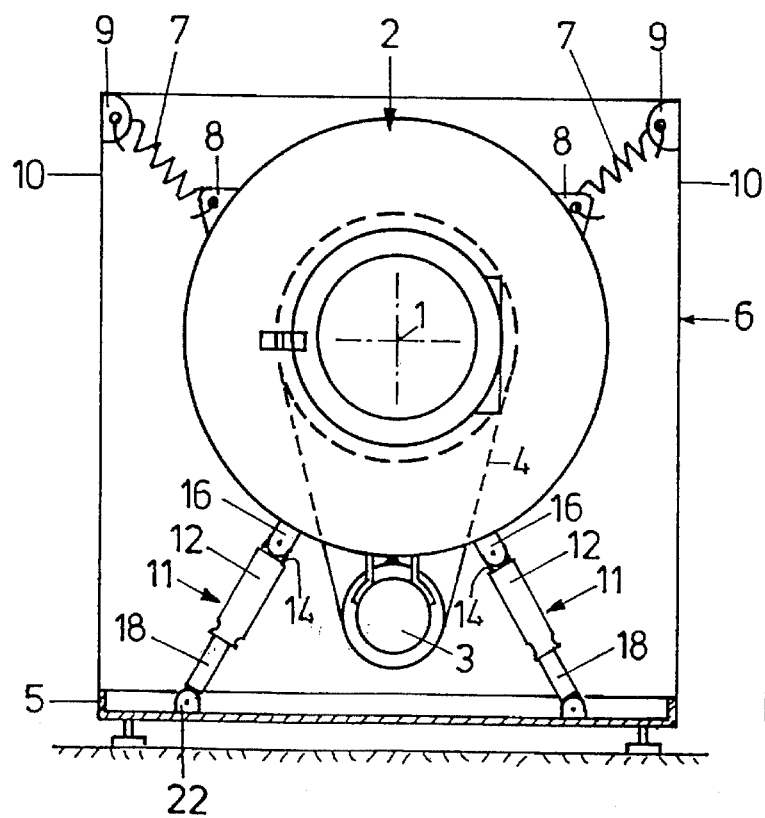
FIG. 2 is a front view of the rotary-drum washing machine according to FIG. 1.

A rotary-drum washing machine with a horizontal drum axis 1 has an osciliatory washer unit 2 with a drive motor 3 driving the washing drum, not shown in detail, by way of a belt drive 4. Further components connected with the washer unit 2, such as a transmission, are not shown for reasons of simplicity. The oscillatory washer unit 2 is suspended by means of helical tension springs 7 on a washing machine housing 6 supported on a machine stand formed by a main frame 5. The tension springs 7 are on the one hand secured to loops 8 arranged in the upper area of the washer unit 2. On the other hand, they are suspended on loops 9 provided on side walls 10 of the housing 6.

Instead of the washer unit 2 being suspended on tension springs 7, a known support of the washer unit 2 may be provided by way of so-called telescopic spring struts on the machine stand 5, as known from U.S. Pat. No. 4,991,412. It is of decisive importance that the suspension or support of the washer unit 2 is freely oscillatory.

Further, vibration dampers 11 are arranged between the washer unit 2 and the machine stand 5, which are frictional dampers.

In the example of embodiment specified in the following, the vibration damper 11 has a housing 12. The housing 12 essentially consists of a cylindrical tube 13 closed at one end by means of a bottom 14. On the outside of the bottom 14, an articulated bush 15 is provided as an articulating element, by means of which the vibration damper 11 is mounted on a bearing 16 on the washer unit 2 such that the vibration damper 11 is arranged to be pivotable relative to the washer unit 2 about a pivot axis 17 which extends parallel to the drum axis 1.

Each vibration damper 11 further has a tappet 18 having in like manner at its outer end an articulated bush 19, of which the pivot axis 20, in the same way as the pivot axis 17, is perpendicular to the central longitudinal axis 21 of the respective vibration damper 11. By this articulated bush 19 the vibration damper 11 is pivotably seized in a bearing 22 arranged on the machine stand 5 in such a manner that the pivot axis 20 also extends parallel to the drum axis 1.

As seen in FIG. 3, the tappet 18 has a cylindrical tappet push rod 23 disposed coaxially to the axis 21. Part of the length of this rod 23 is enclosed by a tappet tube 24, on the outside of which guide ribs 25 are formed, by means of which the tappet 18 is guided on the cylindrical inside wall 26 of the tube 13. While the tappet push rod 23 is of steel, the tappet tube 24 consists of plastics and is injection-molded around the tappet push rod 23. An assembly, tight in the direction of the axis 21, of the tappet push rod 23 and the tappet tube 24 is attained in that projections 27 are formed on the tappet push rod 23, which are produced by deformation of the rod 23.

At its end turned away from the articulated bush 19, the tappet push rod 23 projects beyond the tappet tube 24 by a piston bearing section 28. A damping piston 29 is lodged on this section 28 for displacement in the direction of the axis 21. It has an annular cylinder section 30 provided at both ends with annular flanges 31 projecting toward the inside wall 26 of the tube 13. A friction lining 32 is disposed on this annular cylinder section 30 between the two annular flanges 31, consisting for instance of polyurethane foam, in the open or opened cells of which grease is placed.

An annular chamber 33 is formed between the annular cylinder section 30 and the section 28 of the tappet push rod 23. On its side facing the tappet tube 24, the damping piston 29 has an annular cylindrical bearing bush 34, which is formed in one piece with the annular cylinder section 30 and which is guided to be displaceable on the piston bearing section 28 of the tappet push rod 23 in the direction of the axis 21 and to be rotatable about the axis 21, but fixed radially to the axis 21.

The damping piston 29 is preferably unitary, non-extendable and indivisible, as shown in the drawing.

At its end turned toward the piston bearing section 28, the tappet tube 24 has a receptacle 35 in the form of an annular chamber, which is expanded as compared to the tappet push rod 23 and of which the portion adjacent to the damping piston 29 is of such a size radial to the axis 21 that the bearing bush 34 may slip in. In this receptacle 35, a biased helical compression spring 36 is disposed on the section 28, bearing against the bottom 37 of the receptacle 35 on the one hand and against a facing front 38 of the bearing bush 34 on the other.

In the annular chamber 33 of the damping piston 39, a biased helical compression spring 39 is disposed likewise on the section 28 and bears against another front 40 of the bearing bush 34 on the one hand and against an abutment 41 formed by an annular disk on the free end of the piston bearing section 28 of the tappet push rod 23. This annular disk forming the abutment 41 is fixed on an upset pin 42 of the tappet push rod 23. Radially to the axis 21, the annular chamber 33 is of such a size that by corresponding compression of the spring 39, the damping piston 29 can move along the abutment 41 to such an extent that the latter gets into the annular chamber 33.

FIG. 3 shows the damping piston 29 in a central position on the piston bearing section 28, in which the opposite forces of the compression springs 36 and 39 acting on the damping piston 29 cancel each other, i.e. they are balanced.

When the tappet 18 is pushed into the tube 13 in the direction of insertion 43, then the damping piston 29 is moved in the opposite direction on the piston bearing section 28 in dependence on the damping force produced by friction and acting between the friction lining 32 and the inside wall 26, the compression spring 36 being compressed, i.e. further biased, and the compression spring 39 being released, i.e. expanded. At the end of the motion of insertion of the tappet 18 into the tube 13 in the direction 43, i.e. at the point of reverse of the motion of the tappet 18 from the direction of insertion 43 into the opposite direction of extraction 44, the damping piston 29 will move still a little further in the direction 43, since the compression spring 39 located in the receptacle 35 expands, while the compression spring 39 located in the annular chamber 33 is again compressed. While the return of motion of the tappet 18 takes place abruptly, i.e. basically along a length in the range of zero, the braking of the motion of the damping piston 29 in the direction of insertion 43 is effected by a clearly given length.

When the tappet then moves in the opposite direction of extraction 44, the compression spring 39 is first compressed, while the compression spring 36 is simultaneously released. The reversing motion of the piston 29 takes place very softly, which leads to a reduction of noise at the end of the motion of the tappet 18. In the direction of extraction 44, a corresponding braking and re-acceleration of the piston 29 takes place in the opposite direction. When the washer unit 2 passes through the resonant range upon the transition from washing speed to spinning speed, the oscillation paths of the tappet 18 in relation to the tube 13 are especially long. For the entire range between the reversing motions of the damping piston 29, the friction force produced between friction lining 32 and the inside wall 26 is constant, i.e. the full damping force is produced.

In the case of supercritical speed of the washer unit 2, i.e. in the case of spinning speed, the oscillation paths of the tappet 18 relative to the tube 13 are very short. With such supercritical operation, damping work is not really desired. In this case, the motions of the tappet 18 predominantly take place with the damping piston 29 not moved in relation to the tube 13. The damping performed in this case by the translation of vibration energy into heat tends to zero, a soft reverse at the point of reverse of the tappet 18 from the direction 43 into the direction 44 and vice versa being however ensured. The effect of noise reduction occurs in particular with high final speeds, i.e. in the case of high spinning speeds of the washer unit 2.

The vibration dampers specified below have the same working principle as the vibration damper according to FIG. 3, from which they differ in structure. There is no need of a renewed description of the working mechanism.

FIG. 4 illustrates a modified embodiment of the vibration damper according to FIG. 3, in which the tappet push rod 23' is not fixed in the tappet tube 24' of the tappet 18' by injection molding, but is inserted subsequently. The projections 27' are provided after the mounting, namely by deformation of the tappet push rod 23' in the vicinity of the recesses 45 formed in the tappet tube 24'. In this configuration, the abutment 41' may for instance be produced by flange-type or annular-collar-type upsetting of the piston rod; in any case, it must be provided prior to the mounting. As a result of the configuration described, it is possible to push the tappet push rod 23' by different lengths into the tappet tube 24' so that the helical compression springs 36 and 39 are differently biased. It is further possible to use compression springs 36 and 39 of different lengths, thus changing their characteristics. In FIG. 4, the end 46 of the tappet push rod 23' is shown in a solid line for the embodiment shown. Two other positions of the tappet push rod 23' are shown by dashed lines.

FIG. 5 shows a tappet 18" exclusively made of plastics. It has a tappet push rod 24", to the free end of which the articulated bush 19 is applied. The tappet tube 24" is provided with guide ribs 25" for guidance in the tube 13. Within the tube 13, the tappet 18" is provided with a cylindrical piston-bearing section 28", of which the free end located in the tube 13 is provided with an abutment 41" in the form of a flange projecting outwardly toward and bearing against, the inside wall 26 of the tube 13. On the piston-bearing section 28" a damping piston 29" is disposed, which is formed of an annular cylinder section 30" and of annular flanges 31" defining the latter at both its ends. So it is C-shaped in cross-section. The damping piston 29" is arranged for floating on the piston cylinder section 28" instead of being guided on it. Where the piston-bearing section 28" passes into the tappet tube 24", a stop 47 is provided, which projects in the way of an annular collar or a flange toward the inside wall 26 of the tube 13 and bears against the latter. A helical compression spring 39" is disposed between the damping piston 29" and the abutment 41", whereas the second helical compression spring 36" is disposed between the damping piston 29" and the stop 47. The mounting is made possible by the two-part structure of the tappet tube 24". On the one hand it consists of the piston bearing section 28", on which an internal retaining section 48 in the shape of a truncated cone is formed, on the free end of which retaining projections 49 are formed, projecting outwardly. The other part of the tappet tube 24" consists of an external tappet tube section 50, on which the guide ribs 25" and the stop 47 are formed and to which the articulated bush 19 is fixed. After the mounting of the compression springs 36" and 39" and of the damping piston 29", the external tappet tube section 50 is slipped on the internal retaining section 48, the retaining projections 49 snap-engaging with corresponding openings 51.

In the embodiment according to FIG. 6, the tappet 18''' only consists of a tappet push rod 23''', on the free outer end of which the articulated bush 19 is mounted. The tappet push rod 23''' is substantially guided in a guide bush 52 secured to one end of the tube 13. The tappet push rod 23''' is provided with a tapered section as the piston bearing section 28''', which in the vicinity of its free end, is provided with an abutment 41''' in the form of a disk, which bears against the inside wall 26 of the tube 13 and is retained by a nut 53. Where the piston bearing section 28''' passes into the tappet push rod 23''', a collar is formed, again having a disk resting on it as a stop 47''', which equally bears against the inside wall 26 of the tube 13. Between the abutment 41''' and the stop 47''' a damping piston 29''' is arranged, which — as specified above — consists of an annular cylinder section 30''' having annular flanges 31''' at both its ends, which accommodate a friction lining 32 between them. A ring 55 is formed within the annular cylinder section 30''' on the latter and has some play in relation to the piston bearing section 28''', i.e. it is not guided on the latter. The damping piston 29''' is supported for floating in relation to the piston bearing section 28'''. Two conical compression springs 56, 57 rest on the ring 55, while bearing against the stop 47''' or the abutment 41''', respectively. Due to the fact that the compression springs are conical compression springs 56, 57, with their ends of reduced diameter — referred to the direction of the axis 21 — being supported within the damping piston 29''', there is a saving in overall dimension in the amount of the axial length of the damping piston 29''' minus the axial extension of the contact ring 55. Further, the use of conical compression springs 56, 57, which are likewise biased, ensures the production of a progressive characteristic line.

In the exemplary embodiment according to FIG. 7, the tappet 18'''' is structured very similar to the embodiment according to FIG. 6, the piston bearing section 28'''' being shorter. The damping piston 29'''' consists of an annular cylinder section 30'''' with annular flanges 31'''' accommodating between them a friction lining 32 that bears against the inside wall 26 of the pipe 13. A cup-shaped member 58 is provided inside the annular cylinder section 30'''', forming one piece with the latter. Between the annular cylinder section 29'''' and the member 58, an annular chamber 33'''' is formed, which serves for the partial accommodation of a helical compression spring 39'''', which bears against the latter's bottom 59, which connects the member 58 with the annular cylinder section 29''''. The other end of the helical compression spring 39'''' bears against a disk formed by a nut 53 and serving as an abutment 41''''. Between the cylindrical member 58 and the piston cylinder section 28'''', an annular cylindrical receptacle 35'''' is formed, against the bottom 60 of which a helical compression spring 36'''' bears, which has a smaller diameter than the helical compression spring 39''''. The helical compression spring 36'''' bears against the collar 54 at the transition from the tappet push rod 23'''' to the piston bearing section 28''''.

The fact that the two helical compression springs 36'''' and 39'''' project into the damping piston 29'''', each almost over the latter's full length, serves to achieve an especially small overall dimension of the tappet 18'''' and thus of the vibration damper.

What is claimed is:

1. In a spinner-type washing machine of the type including a frictional damper, the damper being joined to an element having various rotation speeds, the improvement wherein the damper comprises:

a housing (12) including a substantially annular cylindrical inside wall (26) and an axis (21);

a tappet (18; 18'; 18"; 18'''; 18''''), displaceable in the housing (12) in the direction of the axis (21), having a piston-bearing section (28; 28"; 28'''; 28'''') and including stops (41, 37; 41", 47; 41''', 47'''; 41'''', 54) and a first end and a second end, the first end including means for guiding out of the housing (12) and the second end being provided with the piston-bearing section (28; 28"; 28'''; 28'''');

a unitary, non-extendable, and indivisible damping piston (29; 29"; 29'''; 29'''') disposed on the piston-bearing section (28; 28"; 28'''; 28'''')

spring elements bearing against the stops (41, 37; 41", 47; 41''', 47'''; 41'''', 54), the spring elements including a first compression spring bearing on a first damping piston side and a second compression spring bearing on a second damping piston side;

a friction lining (32) disposed on the damping piston (29; 29"; 29'''; 29'''') and elastically pressed against the inside wall (26) of the housing (12), there being a stiction between the friction lining (32) and the inside wall (26) of the housing (12); and fastening elements (19, 15) being formed on the first end of the tappet (18; 18'; 18"; 18'''; 18'''') and on one end of the housing (12), wherein the spring elements are compressively pre-stressed compression springs (36, 29; 36", 39"; 56, 57; 36'''', 39'''') each exerting, a biasing force on the damping piston throughout the piston stroke of the damping pistons;

the damping piston being displaceable between the spring elements over a piston stroke and including abutment faces for the spring elements to bear upon, abutment faces being unmovable in relation to the friction lining; and wherein the spring elements (36, 29; 36", 39"; 56, 57; 36'''', 39'''') are biased such that when the first compression spring (36, 29 ; 36", 39", 56, 57; 36'''', 39'''') is completely compressed, the second compression spring (36, 29; 36", 39"; 56, 57; 36'''', 39'''') is released approximately, but not entirely.

2. The washing machine according to claim 1, wherein the first compression spring and the second compression spring comprise helical compression springs (36, 39; 36", 39"; 36'''', 39'''').

3. The washing machine according to claim 2, wherein at least one helical compression spring (39; 56, 57; 36'''', 39'''') is partially disposed and supported in an annular chamber (33; 33'''', 35'''') within the damping piston (29; 29'''; 29'''').

4. The washing machine according to claim 3, wherein the spring elements (56, 57; 36'''', 39'''') project into an annular chamber (33, 33'''') within the damping piston (29''', 29'''').

5. The washing machine according to claim 4, wherein the spring elements (36'''', 39'''') comprise helical compression springs of different diameters and, while partially overlapping, project into respective nested annular chambers of the damping piston (29''''), the nested annular chambers opening in opposite directions.

6. The washing machine according to claim 2, wherein a helical compression spring (36) is substantially disposed and supported in a receptacle (35) formed on the tappet (18).

7. The washing machine according to claim 6, wherein one of the first compression spring and the second compression spring (36) bears against a bearing bush (34) of the damping piston (29) and wherein the bearing bush (34) is formed to be at least partially immersed into the receptacle (35).

8. The washing machine according to claim 1, wherein the compression springs (36, 39; 36'', 39''; 56, 57; 36'''', 39'''') at least substantially have identical spring constants.

9. The washing machine according to claim 1, wherein the biasing force of the spring elements (36, 29; 36'', 39''; 56, 57; 36'''', 39'''') is about equal to the stiction between the friction lining (32) and the inside wall (26) of the housing (12).

10. The washing machine according to claim 1, wherein a maximum displaceability of the damping piston (29; 29''; 29'''; 29'''') out of a central position of rest on the piston-bearing section (28; 28''; 28'''; 28'''') exceeds the amplitude in the case of supercritical speed of the washing machine.

11. The washing machine according to claim 1, wherein one of the first compression spring and the second compression spring (36) bears against a bearing bush (34) of the damping piston (29).

12. The washing machine according to claim 1, wherein the spring elements are conical compression springs (56, 57).

13. The washing machine according to claim 1, wherein for a change of bias of the compression springs (36, 39), the length of the tappet (18') is adjustable.

14. The washing machine according to claim 1, wherein the tappet (18'') has two parts and wherein one of the stops (41'', 48) for the compression springs (39'', 36'') is formed on each part.

15. The washing machine according to claim 1, wherein the spring elements include coil springs.

16. A frictional damper for spinner-type washing machines, comprising a housing (12) with a substantially annular cylindrical inside wall (26) and an axis (21);

a tappet (18; 18'; 18''; 18'''; 18''''), displaceable in the housing (12) in the direction of the axis (21), having a piston-bearing section (28; 28''; 28'''; 28'''') and stops (41, 37; 41'', 47; 41''', 47''', 41'''', 54) and a first end and a second end, the first end being guided out of the housing (12) and the second end being provided with the piston-bearing section (28; 28'; 28'''; 28'''');

a damping piston (29; 29''; 29'''; 29'''') being disposed on the piston-bearing section (28; 28''; 28'''; 28'''') to be displaceable between spring elements bearing against the stops (41, 37; 41'', 47; 41''', 47''', 41'''', 54);

a friction lining (32) disposed on the damping piston (29; 29''; 29'''; 29'''') and elastically pressed against the inside wall (26) of the housing (12), there being a stiction between the friction lining (32) and the inside wall (26) of the housing (12); and fastening elements (19,15) being formed on the first end of the tappet (18; 18'; 18''; 18'''; 18'''') and on one end of the housing (12), wherein the spring elements are biased compression springs (36, 29; 36'', 39''; 56, 57; 36'''', 39'''') having a biasing force;

wherein for a change of bias of the compression springs (36, 39), the length of the tappet (18') is adjustable; and wherein the tappet (18') comprises an exterior tappet tube (24') and a tappet push rod (23'), which is displaceable in the latter and which is lockable in recesses (45) of the tappet tube (24') by means of projections (27') to be formed on the tappet push rod (23').

17. For frictional damping of an element having various rotation speeds in a spinner-type washing machine, a damper comprising:

a housing (12) including a substantially annular cylindrical inside wall (26) and an axis (21);

a tappet (18; 18'; 18''; 18'''; 18''''), displaceable in the housing (12) in the direction of the axis (21), having a piston-bearing section (28; 28'; 28'''; 28'''') and including stops (41, 37; 41'', 47; 41''', 47''', 41'''', 54) and a first end and a second end, the first end including means for guiding out of the housing (12) and the second end being provided with the piston-bearing section (28; 28''; 28'''; 28'''');

a unitary, non-extendable, and indivisible damping piston (29; 29''; 29''', 29'''') disposed on the piston-bearing section (28; 28''; 28'''; 28'''')

spring elements bearing against the stops (41, 37; 41'', 47; 41''', 47''', 41'''', 54), the spring elements including a first compression spring bearing on a first damping piston side and a second compression spring bearing on a second damping piston side;

a friction lining (32) disposed on the damping piston (29; 29''; 29'''; 29'''') and elastically pressed against the inside wall (26) of the housing (12), there being a stiction between the friction lining (32) and the inside wall (26) of the housing (12); and fastening elements (19, 15) being formed on the first end of the tappet (18; 18'; 18''; 18'''; 18'''') and on one end of the housing (12), wherein the spring elements are compressively pre-stressed compression springs (36, 29; 36'', 39''; 56, 57; 36'''', 39'''') each exerting a biasing force on the damping piston throughout the piston stroke of the damping piston; wherein the damping piston being displaceable between the spring elements over a piston stroke and including abutment faces for the spring elements to bear upon, the abutment faces being unmovable in relation to the friction lining; and wherein the spring elements (36, 29; 36'', 39'', ; 56, 57; 36'''', 39'''') are biased such that when the first compression spring (36, 29; 36'', 39''; 56, 57; 36'''', 39'''') is completely compressed, the second compression spring (36, 29; 36'', 39''; 56, 57; 36'''', 39'''') is released approximately, but not entirely.

\* \* \* \* \*